(12) United States Patent
Hayashi et al.

(10) Patent No.: US 10,998,670 B2
(45) Date of Patent: May 4, 2021

(54) CONNECTION STRUCTURE FOR POWER CONVERSION DEVICE

(71) Applicant: Mitsubishi Electric Corporation, Tokyo (JP)

(72) Inventors: Ryohei Hayashi, Tokyo (JP); Goki Furuya, Tokyo (JP); Hiroaki Takahashi, Tokyo (JP); Masahiro Noguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/604,439

(22) PCT Filed: Apr. 21, 2017

(86) PCT No.: PCT/JP2017/016061
§ 371 (c)(1),
(2) Date: Oct. 10, 2019

(87) PCT Pub. No.: WO2018/193621
PCT Pub. Date: Oct. 25, 2018

(65) Prior Publication Data
US 2020/0176925 A1 Jun. 4, 2020

(51) Int. Cl.
*H01R 13/533* (2006.01)
*H01R 13/33* (2006.01)
*H01R 13/52* (2006.01)
*H02M 7/00* (2006.01)
*B60R 16/02* (2006.01)

(52) U.S. Cl.
CPC ........... *H01R 13/533* (2013.01); *H01R 13/33* (2013.01); *H01R 13/5202* (2013.01); *H02M 7/003* (2013.01); *B60R 16/02* (2013.01); *H01R 2201/26* (2013.01)

(58) Field of Classification Search
CPC .................................................. H01R 13/533
See application file for complete search history.

(56) References Cited

U.S. PATENT DOCUMENTS 10,116,093 B2 * 10/2018 Ishibashi .................. H02K 5/22

FOREIGN PATENT DOCUMENTS

JP 2004-328870 A 11/2004
JP 2011-166981 A 8/2011

OTHER PUBLICATIONS

International Search Report for PCT/JP2017/016061 dated May 30, 2017 [PCT/ISA/210].

* cited by examiner

*Primary Examiner* — Ross N Gushi
(74) *Attorney, Agent, or Firm* — Sughrue Mion, PLLC; Richard C. Turner

(57) ABSTRACT

Provided is a connection structure for a power conversion device to be mounted in a vehicle, including: a casing of the power conversion device; an electric connection part, which is to be mechanically connected to the casing, and is configured to electrically connect the power conversion device and an external device to each other; and an electric conductor configured to electrically connect the power conversion device and the electric connection part to each other, wherein the casing and the electric connection part are mechanically connected to each other through intermediation of an anti-vibration structure, and wherein the electric conductor has such flexibility as to be able to follow a relative displacement between the casing and the electric connection part.

2 Claims, 4 Drawing Sheets

CONNECTION STRUCTURE FOR POWER CONVERSION DEVICE

CROSS REFERENCE TO RELATED APPLICATIONS

This application is a National Stage of International Application No. PCT/JP2017/016061, filed on Apr. 21, 2017.

TECHNICAL FIELD

The present invention relates to a connection structure for a power conversion device, which is suitable to be mounted in a vehicle.

BACKGROUND ART

In a vehicle using an electric motor as a power source, power conversion devices such as an inverter and a converter are mounted to drive the electric motor with power of a battery. In those power conversion devices described above, in terms of reliability of electric connection to the battery or the electric motor, it is necessary to give full consideration to a conduction failure caused by, for example, mechanical breakage or dielectric breakdown due to intrusion of water or a conductive foreign substance in a connection portion, which may be caused by an external force such as vibration occurring while the vehicle is running.

The power conversion device described above adopts an anti-vibration structure for a mechanical connection portion to a vehicle in many cases especially when the power conversion device is mounted in an engine room where vibration conditions are severe (see, for example, Patent Literature 1).

Further, in view of connection reliability of an electrical connection portion, a harness having one end connected to an external device such as the battery or the electric motor is mechanically firmly fastened to the power conversion device through intermediation of a bracket integrated with the harness itself in many cases. With the adoption of the fastening structure described above, waterproofness between a casing and a joint portion of the harness is ensured (see, for example, Patent Literature 2).

Thus, in a related-art structure, for the electrical connection portion for which high reliability is demanded, an influence of the external force, which is generated under the severe vibration conditions, is alleviated with flexibility of the harness. Further, in the related-art structure, the casing and the harness are mechanically firmly connected to each other through intermediation of the bracket integrated with the harness to ensure the waterproofness.

CITATION LIST

Patent Literature

[PTL 1] JP 2004-328870 A
[PTL 2] JP 2011-166981 A

SUMMARY OF INVENTION

Technical Problem

However, the related art has the following problem.

With an increase in output of the power conversion device, an electric conductor such as the harness is required to ensure a conductive area so as to alleviate the effect of, for example, heat generation or a reduction in voltage, which is caused by energization. Along with the necessity of ensuring the conductive area, stiffness of the harness itself is increased. As a result, flexibility of the harness is decreased. Hence, it becomes difficult to apply the harness under the severe vibration conditions.

The present invention has been made to solve the problem described above, and has an object to obtain a connection structure for a power conversion device, which has an electrical connection structure without impairing flexibility even when a conductive area is increased along with an increase in output of the power conversion device and is applicable under the severe vibration conditions when the power conversion device is mounted in a vehicle.

Solution to Problem

According to one embodiment of the present invention, there is provided a connection structure for a power conversion device to be mounted in a vehicle, including: a casing of the power conversion device; an electric connection part, which is to be mechanically connected to the casing, and is configured to electrically connect the power conversion device and an external device to each other; and an electric conductor configured to electrically connect the power conversion device and the electric connection part to each other, wherein the casing and the electric connection part are mechanically connected to each other through intermediation of an anti-vibration structure, and wherein the electric conductor has such flexibility as to be able to follow a relative displacement between the casing and the electric connection part.

Advantageous Effects of Invention

According to one embodiment of the present invention, the anti-vibration structures to be applied under the severe vibration conditions can be provided not only to a mechanical connection portion but also to the electrical connection portion. Further, owing to flexibility of the anti-vibration structures, required product accuracy can be reduced, and work to be performed in the electric conversion device is eliminated. Thus, manufacturing management can be simplified to enable reduction in manufacturing cost.

DESCRIPTION OF EMBODIMENT

Figure 1:
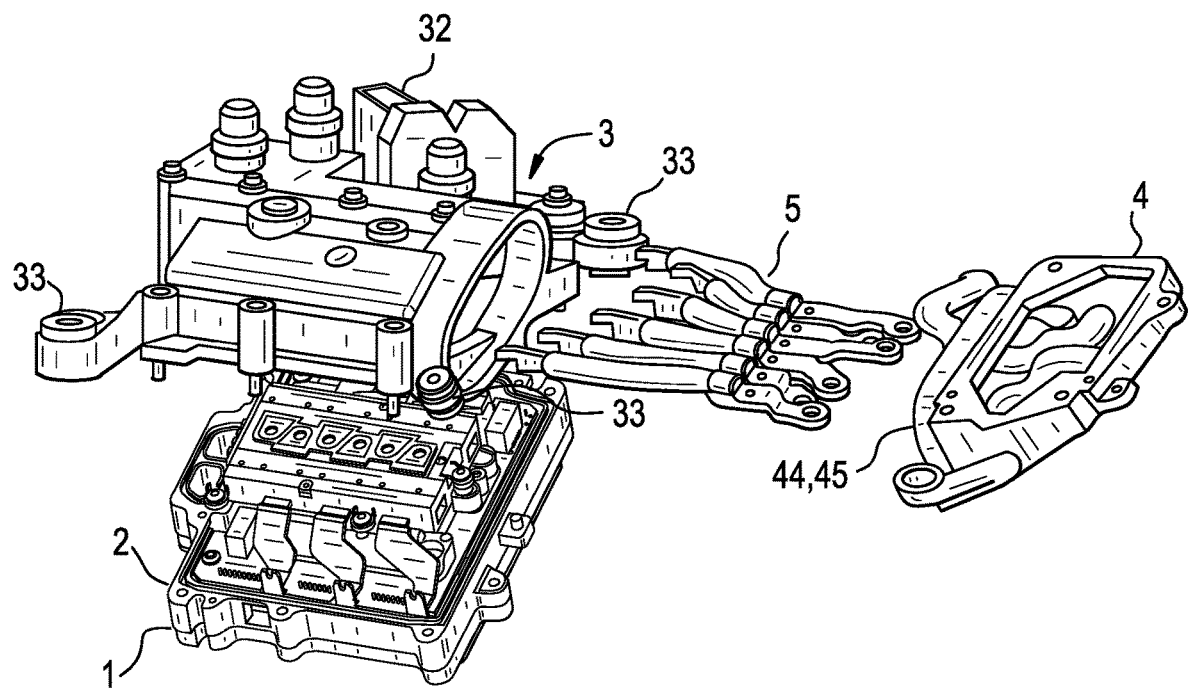
FIG. 1 is a perspective development view for illustrating a power conversion device in a first embodiment of the present invention.

Referring to the accompanying drawings, connection structure for a power conversion device according to an exemplary embodiment of the present invention is described below. In the drawings, the same or corresponding parts are denoted by the same reference symbols for description.

First Embodiment

FIG. 1 is a perspective development view for illustrating a connection structure for a power conversion device in a first embodiment of the present invention. As illustrated in FIG. 1, the power conversion device in the first embodiment includes a cooler 1, cases 2 and 3, an electric connection part 4, and a cable 5. The cases 2 and 3 correspond to a casing of the power conversion device.

Figure 2:
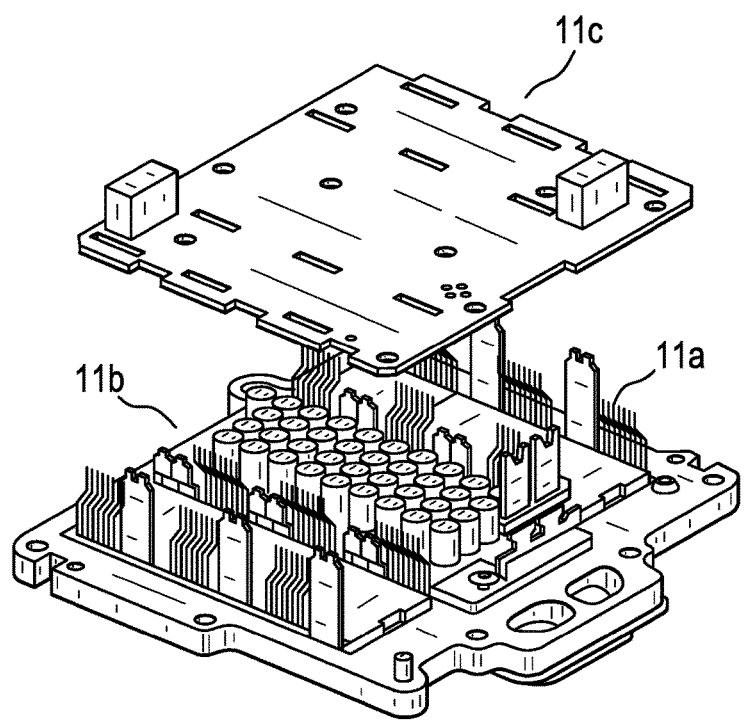
FIG. 2 is a perspective view of a power conversion circuit to be built in the power conversion device in the first embodiment of the present invention.

FIG. 2 is a perspective view of a power conversion circuit to be built in the power conversion device in the first embodiment of the present invention. A power conversion circuit 11 illustrated in FIG. 2 includes a plurality of semiconductor modules 11a, a capacitor 11b, and a control board 11c. The power conversion circuit 11 is accommodated in the cooler 1 illustrated in FIG. 1.

Figure 3:
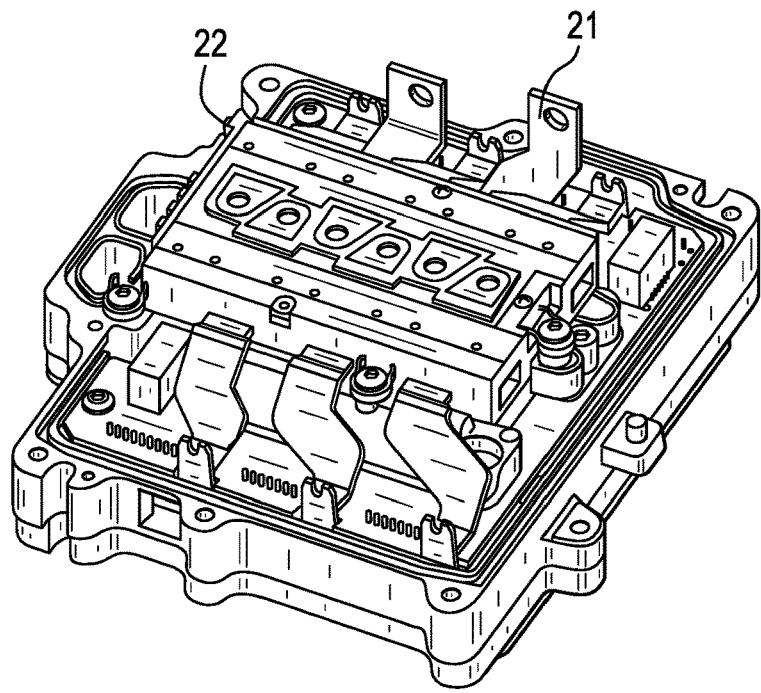
FIG. 3 is an internal configuration view of a case of the power conversion device in the first embodiment of the present invention.

FIG. 3 is an internal configuration view of the case 2 of the power conversion device in the first embodiment of the present invention. In FIG. 3, a state in which a resin-molded component 21 and a current sensor 22 are accommodated in the case 2 is exemplified.

In this case, the resin-molded component 21 is formed integrally with a bus bar through which a DC current supplied from a battery passes. The current sensor 22 is a sensor configured to detect an AC current to be input to an electric motor.

The bus bar and the current sensor 22 are electrically connected to the electronic components included in the power conversion circuit 11 accommodated in the cooler 1.

Figure 4:
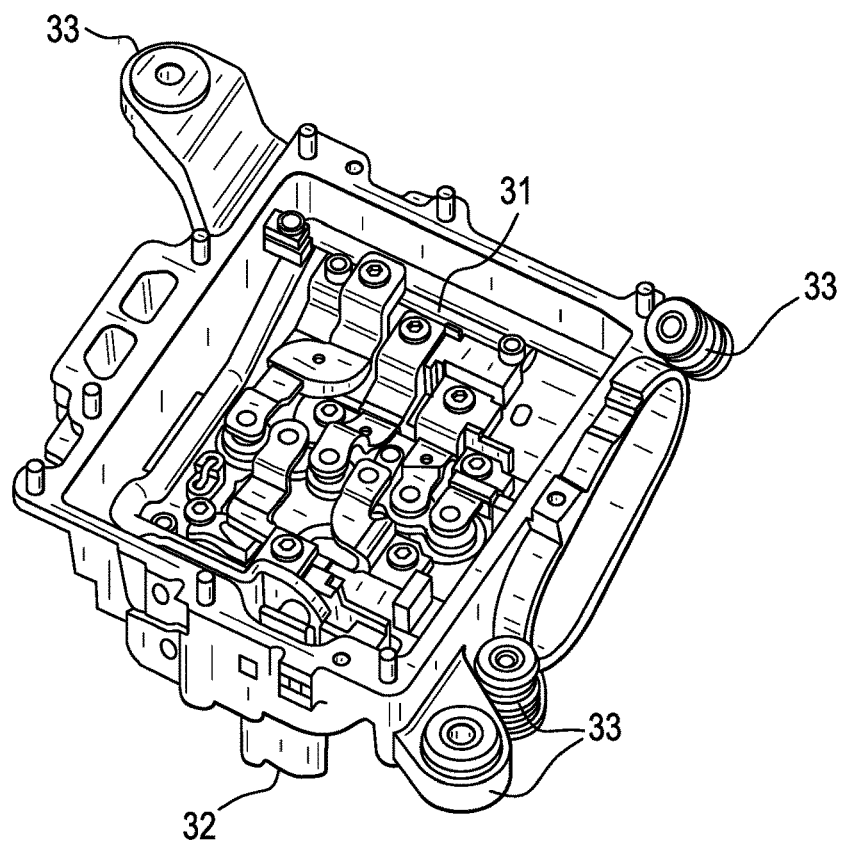
FIG. 4 is an internal configuration view of a case of the power conversion device in the first embodiment of the present invention.

FIG. 4 is an internal configuration view of the case 3 of the power conversion device in the first embodiment of the present invention. In FIG. 4, a state in which a resin-molded component 31 and a terminal block 32 are accommodated in the case 3 is exemplified.

In this case, the resin-molded component 31 is formed integrally with a bus bar through which an AC current to be input to the electric motor passes. The terminal block 32 is electrically connected to a cable having one end connected to the battery. Further, the case 3 has anti-vibration structures 33 configured to mechanically connect the power conversion device and an engine to each other.

The electric connection part 4 is mechanically connected to the case 3 through intermediation of the anti-vibration structures 33. Although detailed illustration is omitted, the electric connection part 4 includes a resin-molded component 41 (see FIG. 6), a terminal, an interlock portion, and waterproof sealing portions 44 and 45.

Figure 6:
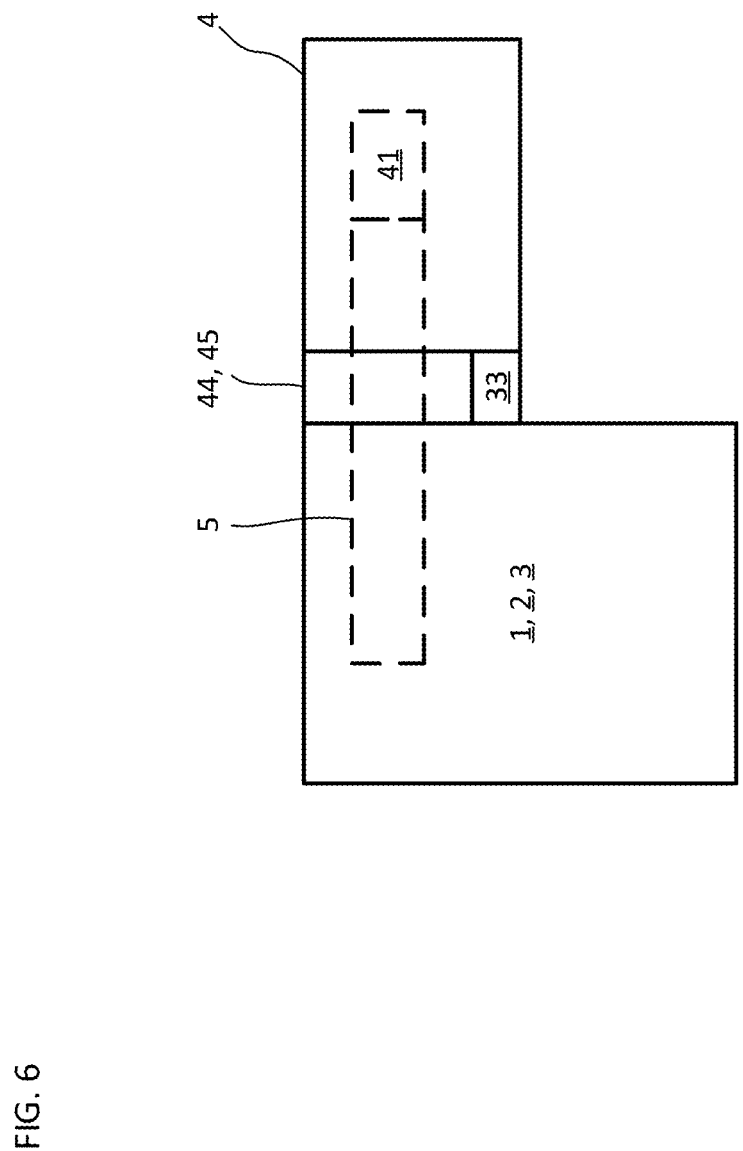
FIG. 6 is a diagram of a power conversion device of an embodiment.

In the configuration described above, the resin-molded component 41 is formed integrally with a bus bar through which the AC current to be input to the electric motor passes, and is electrically connected to the power conversion device accommodated in the case 2 through the cable 5 (see FIG. 6). The terminal serves to input and output a control signal. The interlock portion detects exposure of a high-pressure portion in terms of insulation protection. The electric connection part 4 has a waterproof function with use of the waterproof sealing portions 44 and 45.

Figure 5:
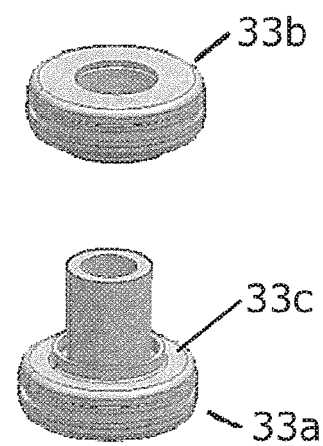
FIG. 5 is a development view of an anti-vibration structure for the power conversion device in the first embodiment of the present invention.

FIG. 5 is a development view of the anti-vibration structure to be used as a connection structure for the power conversion device in the first embodiment of the present invention. Each of the anti-vibration structures 33 illustrated in FIG. 4 referred to above has a triplex structure including an inner bush 33a having a flange and a cylindrical shape, an outer bush 33b having a flange and a cylindrical shape, and a metal elastic member 33c. In the triplex structure, the inner bush 33a and the outer bush 33b sandwich the metal elastic member 33c arranged therebetween.

The metal elastic member 33c has a fibrous metal braided structure. The metal elastic member 33c has a structure in which the fibrous metals rub against each other at the time of vibration to convert vibrational energy into thermal energy so as to absorb the vibrational energy, as in the case of a general anti-vibration rubber.

The above-mentioned anti-vibration structures 33 are provided not only to a mechanical connection portion between the power conversion device and the engine but also to a fastening portion between the case 3 and the electric connection part 4. Thus, the anti-vibration structures 33 exert an effect not only for the anti-vibration against vibration propagating from the engine but also for anti-vibration against vibration propagating from a component firmly fastened to the electric connection part 4 of the power conversion device.

Next, the waterproof sealing portions 44 and 45 located between the case 3 and the electric connection part 4 are described. The waterproof sealing portion 44 is arranged between a part of the cable 5 and the electric connection part 4, and can be achieved as a rubber packing. The waterproof sealing portion 44 serves to ensure waterproofness through close contact between the electric connection part 4 and the cable 5.

Meanwhile, the waterproof sealing portion 45 is arranged between the case 3 and the electric connection part 4, and can be achieved as a packing obtained through integration of a sealing portion and a deformation following structure portion. The sealing portion ensures waterproofness through close contact between the case 3 and the electric connection part 4. Meanwhile, the deformation following structure portion has a flexibly deformable structure so as to follow deformation of the electric connection part 4.

As described above, the waterproof sealing portion 45 is formed of the packing obtained through integration of the sealing portion and the deformation following structure portion, and hence achieves both the waterproofness and the flexibility at the same time. In order to sufficiently ensure the waterproofness when the deformation following structure portion follows the deformation of the electric connection part 4, a metal core is inserted in the integrated packing to achieve closer contact with the case 3.

A first feature of the present invention lies in the connection structure for the electric conversion device to be mounted in the engine. The electric conversion device and the engine are mechanically connected to each other through intermediation of the anti-vibration structures 33. Meanwhile, the electric connection part 4 of the power conversion device is installed outside the case 3 and is mechanically and electrically connected to the case 3 through intermediation of the anti-vibration structures 33 and the cable 5 being a flexible conductor.

An electric conductor may be used in place of the cable 5. In a case in which the electric conductor is used, when the electric conductor is formed through lamination of a plurality of thin plates, such flexibility as to be able to follow a relative displacement between the case 3 and the electric connection part 4 can be provided.

A connection portion between the case 3 and the electric connection part 4 is covered with the waterproof sealing portions 44 and 45, each being a flexible waterproof structure. Thus, a degree of freedom in position of the electric connection part 4 is high. Thus, required positional accuracy of a component to be connected to the power conversion device can be reduced. At the same time, when the electric connection part 4 is electrically connected to the power conversion device, connection work inside the case 3 of the power conversion device is not required.

A second feature of the present invention lies in a configuration of the anti-vibration structures 33. Each of the anti-vibration structures 33 has the following structure. Specifically, the inner bush 33a having the flange and the cylindrical shape and the outer bush 33 having the flange and the cylindrical shape are configured to sandwich the metal elastic member 33c formed of the fibrous metal braids therebetween. The cylindrical portion of the inner bush 33a is fitted to an inner side of the cylindrical portion of the outer bush 33b. At the same time, the flanges are superimposed on one another.

A third feature of the present invention lies in the flexible waterproof structure. The connection portion between the case 3 and the electric connection part 4 is covered with the packing having both the sealing portion and the deformation following structure portion. The sealing portion provides the waterproofness through the close contact with the case 3. The deformation following structure portion has such flexibility as to be able to follow the relative displacement between the case 3 and the electric connection part 4, which is caused by an external force such as vibration of the vehicle.

As described above, the connection structure for the power conversion device according to the first embodiment has the anti-vibration structures, which are applicable under severe vibration conditions in the connection portion between the electric connection part and the casing, and the flexible mechanical connection structure. As a result, the electric connection part has a high degree of freedom in position, and can reduce the required positional accuracy of the component to be connected to the power conversion device.

Further, the electric connection part is formed as having a casing independent of the power conversion device. Therefore, for example, when a cable having one end connected to the electric motor is electrically connected to the power conversion device, the connection work inside the casing of the power conversion device can be eliminated.

REFERENCE SIGNS LIST 2, 3 case, 4 electric connection part, 5 cable, 33 anti-vibration structure, 44, 45 waterproof sealing portion

The invention claimed is:
1. A connection structure for a power conversion device to be mounted in a vehicle, comprising:
a casing of the power conversion device;
an electric connection part, which is to be mechanically connected to the casing, and is configured to electrically connect the power conversion device and an external device to each other; and
an electric conductor configured to electrically connect the power conversion device and the electric connection part to each other,
wherein the casing and the electric connection part are mechanically connected to each other through intermediation of an anti-vibration structure,
wherein the electric conductor has such flexibility as to be able to follow a relative displacement between the casing and the electric connection part, and
wherein the electric connection part has a waterproof structure, which is arranged between the casing and the electric connection part and encircles the electric conductor, and is configured to achieve close contact between the casing and the electric connection part.
2. The connection structure for the power conversion device according to claim 1, wherein the waterproof structure is a packing with flexibility, such as to be able to follow the relative displacement between the casing and the electric connection part caused by an external force.

* * * * *